Oct. 30, 1962  R. E. WORTHINGTON  3,061,065
APPARATUS FOR HANDLING VENEER
Filed Oct. 10, 1958  4 Sheets-Sheet 3

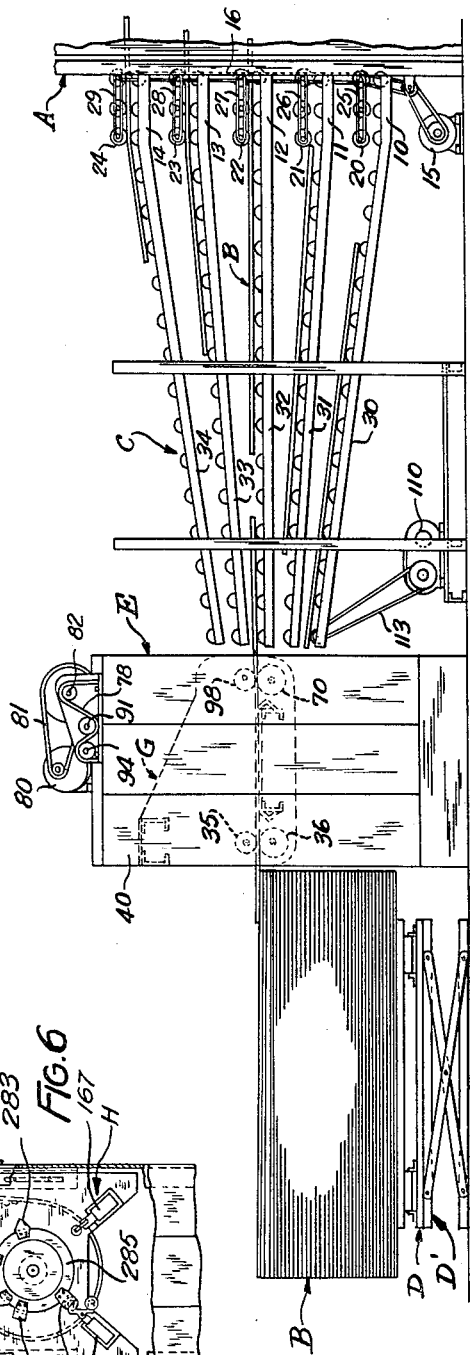

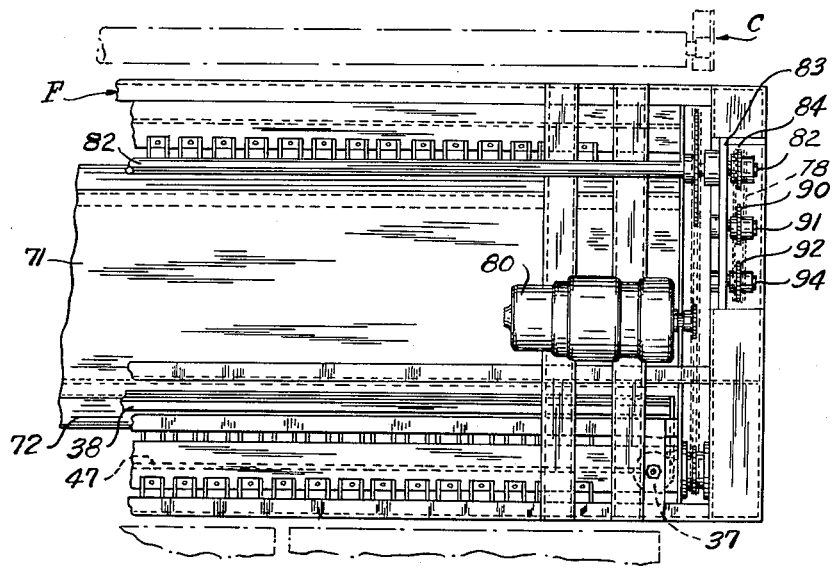
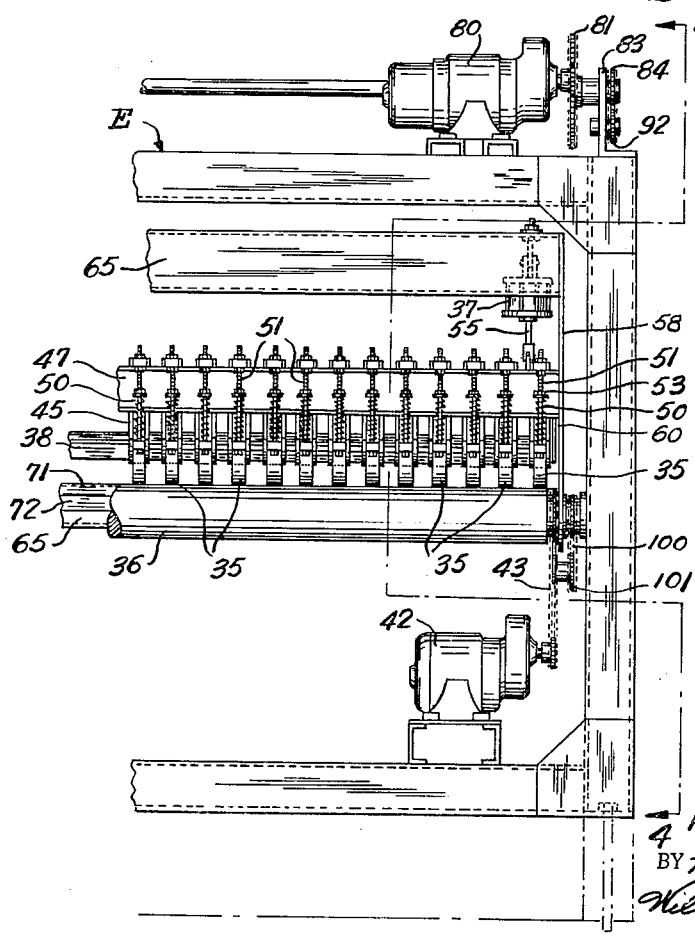

INVENTOR.
ROY E. WORTHINGTON
BY Hudson Boughton,
Williams, David & Hoffmann
ATTORNEYS Oct. 30, 1962　　　R. E. WORTHINGTON　　　3,061,065
APPARATUS FOR HANDLING VENEER
Filed Oct. 10, 1958　　　　　　　　　　　　　4 Sheets-Sheet 4

INVENTOR.
ROY E. WORTHINGTON
BY Hudson, Boughton,
Williams, David & Hoffmann
ATTORNEYS

United States Patent Office 3,061,065
Patented Oct. 30, 1962

3,061,065
APPARATUS FOR HANDLING VENEER
Roy Edward Worthington, Painesville, Ohio, assignor to The Coe Manufacturing Company, Painesville, Ohio, a corporation of Ohio
Filed Oct. 10, 1958, Ser. No. 767,080
1 Claim. (Cl. 198—20)

The present invention relates to material handling apparatus and more particularly to apparatus for feeding veneer to a multiple deck apparatus such as multiple deck conveyor section. This application is a continuation-in-part of my copending application Serial No. 750,119, filed July 22, 1958, now abandoned.

The principal object of the invention is the provision of a simple, inexpensive and reliable apparatus for feeding or assisting in the feeding of sheet material, such as wet veneer, from a stack of sheets to a multiple deck conveyor section, which apparatus will be compact and require a minimum of floor space.

The invention resides in certain constructions, and arrangements and combinations of parts and further objects and advantages will become apparent to those skilled in the art to which it relates from the following description of the preferred embodiment described with reference to the accompanying drawings forming a part of this specification, in which similar reference characters designate corresponding parts, and in which:

FIG. 1 is a side elevational view of apparatus embodying the present invention, illustrating its use in feeding wet veneer to a multiple deck conveyor type veneer dryer;

FIG. 2 is a fragmentary side elevational view of the so-called feeder shown in FIG. 1 looking into the feed side;

FIG. 3 is a fragmentary plan view of the feeder shown in FIG. 2;

FIG. 6 is a fragmentary view of the apparatus shown in FIG. 1, showing a modification of the preferred embodiment.

Figure 4:
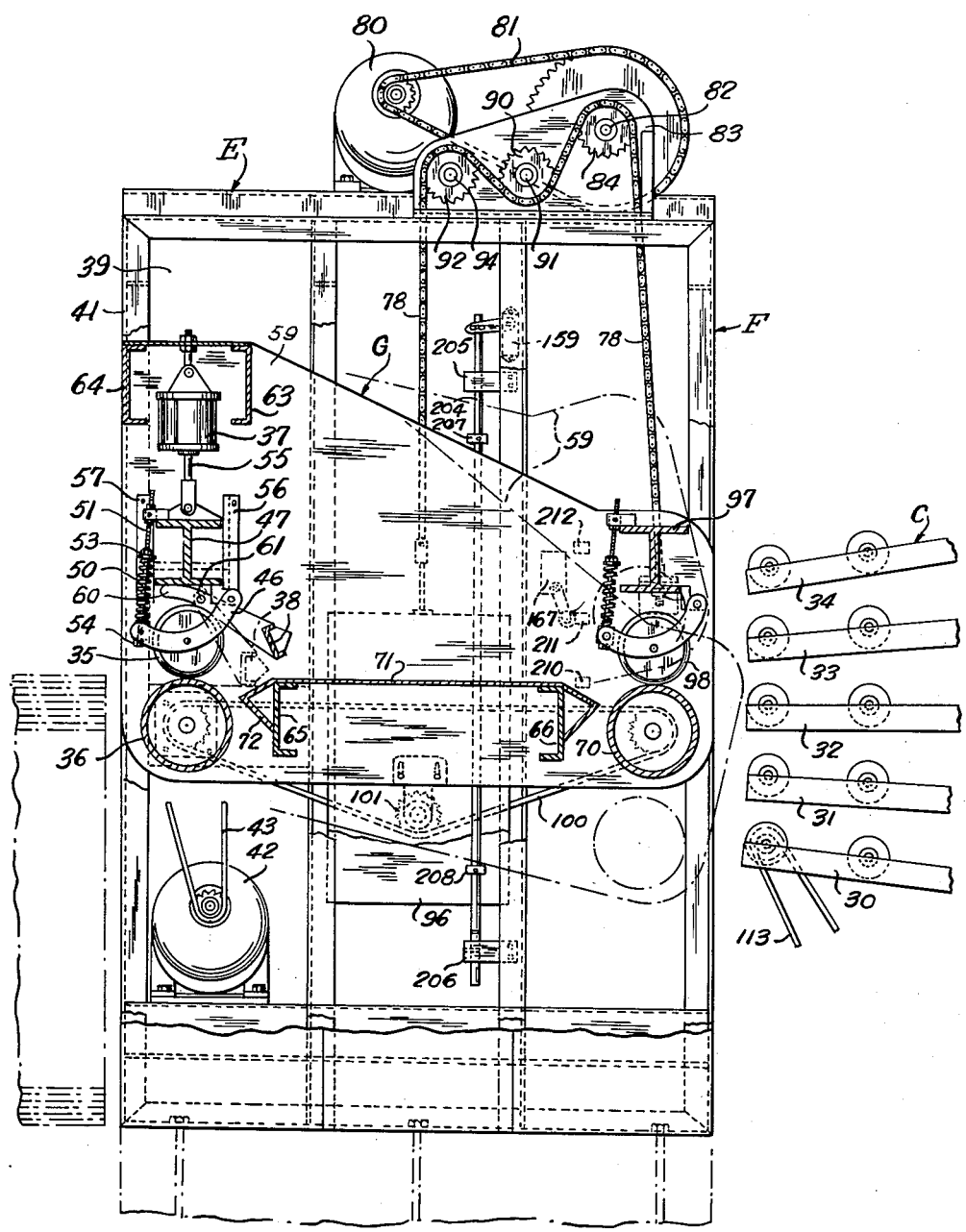
FIG. 4 is an end elevational view of the feeder with the near cover plates removed and with portions broken away and parts in section approximately on line 4—4 of FIG. 2.

Although the illustrative embodiment of the invention will be described in detail, it is to be understood that the invention is not limited to the construction and arrangement of the parts shown and described, but is capable of being otherwise embodied and of being practiced and carried out in various ways. It is also to be understood that the phraseology or terminology employed herein is for the purpose of description and not of limitation, and there is no intention to thereby limit the invention beyond the requirements of the prior art.

Referring to the drawings, the reference character A designates the infeed end of a five-deck, roller conveyor type, veneer dryer of commercial construction. The dryer A is not herein shown and described in detail because dryers of the type referred to are well known in the art and the dryer per se forms no part of the present invention. The rollers of the respective decks 10 to 14 are all driven at a predetermined uniform speed by suitable means, such as the motor 15 connected thereto by a sprocket chain drive 16, and operate to move sheets of veneer, indicated by the reference character B, fed thereto through the dryer.

The respective decks of the dryer A project a short distance in front of the feed end of the dryer proper and each deck is provided with a pair of top rollers 20 to 24, which cooperate with the deck rollers at the left-hand ends of the decks to feed the veneer into the dryer proper. As shown, the pairs of top rollers 20 to 24, are carried by arms 25 to 29, pivoted at their right-hand ends on transversely extending shafts located above the plane of the decks proper. Gravity holds the top rollers in engagement with the top sides of the sheets of veneer. The top rollers of the various decks are driven from the electric motor 15 through the sprocket chain drive 16.

The decks 10 to 14 of the dryer A are spaced a considerable distance one above the other and, as is the usual practice, the dryer as shown is preceded by a multiple deck roller conveyor type feed section or unit designated generally by the reference character C and comprising a plurality of roller conveyor decks 30 to 34. The ends of decks of the feed section C adjacent to the dryer are connected to the dryer decks and the rollers thereof are driven from the drive 16 for the decks of the dryer so that veneer thereon is moved to the dryer at the same speed at which veneer moves through the dryer. The ends of the decks of the feed section C remote from the dryer converge so as to facilitate the feeding of veneer thereto.

The usual practice is to bring stacks of green veneer, cut to predetermined lengths to the dryer on trucks or the like and have workmen remove the pieces of veneer from the stacks and feed them by hand into the various decks of the dryer or roller conveyor feed section, if one is employed. The stacks of veneer B in the embodiment shown are brought to the dryer A upon a roller conveyor having an elevatable section D in line with the infeed end of the dryer, supported upon an operator controlled power scissors type-lift or elevator D' of conventional construction.

The present invention further provides a simple, inexpensive apparatus or feed unit E positioned immediately adjacent to and interposed between the infeed end of the multiple deck roller conveyor feed section or unit C and the elevatable conveyor section D for facilitating the feeding of the veneer from the stack or stacks to the various decks of the conveyor feed section C. The operator either standing upon the floor or upon a raised platform pushes the top piece or pieces of veneer on the stack or stacks as the case may be, underneath rubber covered wheels or narrow rolls 35, spring biased toward a bottom roll 36, but adapted to be normally held in a position thereabove by fluid pressure operated motors 37 at opposite ends of the feed unit E. The veneer is pushed between the top rolls 35 and the bottom roll 36 until it strikes stop 38 normally positioned in the path of the veneer to the rear of the rolls referred to but adapted to be moved above the path of the veneer when the top rolls are in their lower position, that is, in a position to engage the bottom roll 34 or the veneer thereabove. The operator can maintain the top of the stack of veneer level or approximately level with the top of the bottom roll 36 by use of the elevator D'. Guide members extending transversely across the feed unit in front of the rolls 35, 36 may be employed, if desired, to assist in guiding the veneer into a position between the feed rolls 35, 36, even though they are not exactly aligned with the top of the stack of veneer.

The bottom roll 36 is rotatably supported by stud shafts projecting from opposite ends thereof in suitable bearings fixed to the inside plates 39 of the opposite end members 40, 41 of the frame of the feed unit, which frame is built up of structural members and plates, and is designated generally by the reference character F. The roll 36 is continuously driven from an electric motor 42 through a sprocket chain drive, designated generally as 43. The driven sprocket of the drive 43 is keyed to the projecting stud shaft at the right-hand end of the roll 36 as viewed in FIG. 2.

The top rolls 35 are not driven and are rotatably supported on individual stud shafts, each of which is fixedly secured in a pair of arcuate shaped members 45, 46, the right-hand ends of which, as viewed in FIG. 4, are pivotally connected to the underside of a vertically movable slide 47 in the form of an I-beam. The opposite ends of each pair of the levers 45, 46 are spring biased in a counterclockwise direction about their pivoted connection to the slide 47 by a compression spring 50 on a rod 51. The lower end of each rod 51 slidably projects through a block pivotally connected to the left-hand ends of the members 46, as viewed in FIG. 4 and the upper end of the rod is adjustably connected to a similar block pivotally connected to the upper left-hand flange of the I-beam which forms the slide 47. The lower end of the rod 51 which slidably projects through the block connected to the levers 45, 46 is provided with a head 54 which limits movement of the levers 45, 46 relative to the rod 51 in a counterclockwise direction while permitting movement therebetween in the opposite direction. Each of the springs is compressed between the block at the end of the rod 51 connected to the members 45, 46 and a washer imposed between the upper end of the spring 50 and an adjustment nut 53 threaded onto the rod 51 below its pivotal connection to the beam 47. The construction is such that the spring 50 holds the block at the lower end of the rod in engagement with the head 54 of the rod but allows the block at the lower end of the rod, its associated roll 35, and the members 45, 46 associated therewith, to move upwardly against the force of the spring 50 when the slide 47 is moved in a downwardly direction to engage the rolls 35 with the roll 36 or the veneer thereabove as the case may be.

The slide 47 is suspended, so to speak, from the fluid pressure operated motors 37 previously referred to for movement towards and from the roll 36. The cylinders of the motor are pivotally connected to the frame of a conveyor mechanism or cradle designated generally by the reference character G and the piston rods 55 of the motors are pivotally connected to the top of the slide 47 adjacent to opposite ends thereof. Opposite ends of the slide 47 are guided in their movement toward and from the roll 36 by suitable guide plates or brackets 56, 57 connected to opposite end members 58, 59 of the frame of the cradle G. The construction is such that the slide 47 and in turn, the rollers 35 may be moved radially of the roll 36 by actuation of the fluid pressure motors 37.

The stop 38 comprises a channel member extending across the cradle G and having its opposite ends fixedly connected to levers 60 pivotally connected to the end members 58, 59 of the cradle for rotation about pivots 61 underneath the beam or slide 47. The levers 60 have extensions projecting to the left of the pivots 61, as viewed in FIG. 4, and which engage the underside of the slide. The construction is such that as the slide 47 is lowered to engage the rolls 35 with the roll 36 or veneer thereabove the stop 38 is raised out of the path of the veneer.

The opposite end members 58, 59 of the cradle G are formed of two trapezoidal-like plates, located inside of but closely adjacent to the opposite end members 40, 41 of the frame F of the feed unit proper. The members 58, 59 are fixedly connected together by two pairs of transversely extending channels 63, 64 connected to the members 58, 59 adjacent to their uper edges at the infeed end of the cradle and 65, 66 connected thereto adjacent to the lower end of the cradle. The upper edges of the channels 65, 66 are approximately in line with the top of the roll 36 and a similar roll 70 rotatably supported in the opposite or right-hand end of the cradle G and the space therebetween is spanned by a plate 71 fixed thereto and having its forward edge 72 which projects forwardly of the channel 65 inclined downwardly and bent back at an angle to help guide the veneer from the roll 36 to the top of the plate 71. The roll 70 is supported in the opposite end members 58, 59 of the cradle G by stud shafts projecting from opposite ends thereof in a manner similar to that in which the roll 36 is rotatably supported in the end members 40, 41 of the frame F of the feed unit.

The end members 58, 59 of the cradle G are pivotally connected adjacent to their lower left hand corners to the stud shafts projecting from opposite ends of the roll 36 and the opposite or right-hand end of the cradle G is suspended by two sprocket chains 78 one at either end of the cradle and is adapted to be raised and lowered by a reversible electric motor 80 mounted on the top of the frame F of the feed unit. The motor 80 is connected by a sprocket chain drive 81 to a shaft 82 projecting across the top of the frame of the feed unit and rotatably supported thereabove by suitable brackets 83. Opposite ends of the shaft 82 are provided with sprocket wheels 84 about which the sprocket chains 78 are reeved. One end of one of the sprocket chains 78 is connected to one of the end members 58, 59 of the cradle G and one end of the other chain 78 is connected to the other end member of the cradle. From the sprocket wheels 84 the sprocket chains are reeved underneath sprocket wheels 90 rotatably connected to short shafts 91 fixed in the brackets 83 and then over sprocket wheels 92 rotatably connected to short shafts 94 supported in the brackets 83. From sprocket wheels 94, the sprocket chains extend in a downwardly direction where the ends thereof are connected to counterweights 96 slidably supported in suitable guides in the end members of the frame F of the feed unit.

The upper right hand end of the cradle G, as viewed in FIG. 4, is provided with a beam 97 extending between the end members 58, 59. The beam 97 is similar to the beam 47 and like the beam 47, carries a plurality of rolls 98 similar to the rolls 35 and connected thereto in a manner similar to that in which the rolls 35 are connected to the beam 47. The beam 97 is fixedly connected to the end plates 58, 59 of the cradle and its connection thereto is such that the rolls 98 are normally biased into engagement with the roll 70, which latter roll is continuously driven in timed relation to the roll 36 by sprocket chain drives 100 comprising sprocket chains reeved about suitable sprockets fixed to the projecting stud shafts at both ends of the rolls 36, 70 as the apparatus is viewed in FIGS. 2 and 3. In the embodiment shown idler sprockets 101 adjustably connected to the end plates of the cradle G are provided for taking up slack in the sprocket chains of the sprocket drives 100.

The cradle G is moved vertically and the rolls 35 lowered and raised in timed relation to each other and the speed of movement of the decks of the dryer and feed section by a synchronizing unit 110 comprising two cam-operated switches 111, 112. The unit 110 is connected by a sprocket chain drive 113 to one of the rollers of the lower deck 30. The unit 110 preferably contains means for adjusting the speed of the cams relative to the speed of the conveyors to provide for the feeding of sheets of different lengths, etc.

Referring to the wiring diagram, the apparatus is placed in operation by depressing a start push button switch 115 to close the normally open contacts 116, 117 thereof and establish a circuit from the power line 118 through the normally closed contacts 120, 121 of the stop push button switch 122, wire 123, the now closed normally open contacts 116, 117 of start push button switch 115, wire 124, normally closed overload contacts 125, 126, wire 127, and operating solenoid 130 of motor controller 131 for motor 42 to power line 132. The overload contacts 125, 126, the operating solenoid 130 and the wire 127 are a part of a motor controller 131 for the motor 42 which drives the rolls 36, 70 of the feeding unit F. Energization of the operating solenoid 130 of the motor controller 131 closes the normally open contacts 133, 134 also forming a part of the motor controller which establishes a holding circuit around the start push button switch 115 which may now be released. Energization of the operating solenoid 130 also closes the normally open contacts 135 and 136, 137 and 138, 139 and 140 connecting the motor 42 to the power lines 118, 132, 141 starting the motor 42 which, in turn, drives the rolls 36, 70. The motor continues to operate until stopped by depressing the stop push button switch 122 to open its normally closed contacts and break the holding circuit for the solenoid 130. The start and stop push button switches 115, 122 may be positioned at any convenient location about the machine.

The vertically movable end of the cradle G may be manually raised or lowered, as may be desired in setting up the apparatus, by closing normally open up and down push button switches 142, 143, respectively. Closing normally open up push button switch 142 closes its normally open contacts 144, 145 establishing a circuit from the line 123 through the now closed contacts 144, 145, wire 146, operating solenoid 147 of relay 148 to line 132, closing its normal open contacts 149, 150 and 151, 152. The closing of these contacts establishes a circuit from the wire 123 through the now closed contacts 149, 150 wire 153, contacts 157, 158 of direction selector switch 159, which contacts are normally closed, wire 160 normally closed contacts 161, 162 of overtravel limit switch 163 not shown except in the wiring diagram, wire 164, now closed contacts 151, 152 or normally closed contacts 165, 166 of index switch 167 fixed to the frame of the feed unit F which switch controls the rest positions of the movable end of the cradle G with the intermediate decks 31, 32, 33 in alignment with the rolls 70, 98, wire 168, normally closed contacts 169, 170 of motor controller 171, wire 172, operating solenoid 173 of motor controller 171, wire 174, and normally closed overload contacts 175, 176 of motor controller 171 to line 132. If the direction switch 159 is not in the position shown in the wiring diagram the cradle G will move down to its lower position thereby reversing the contacts of the reversing switch 159. The cradle G will then move up as long as the up push button switch 142 is held closed and until the switch 167 is actuated the first time subsequent to release of the up push button switch 142. Energization of the operating solenoid 173 of motor controller 171 closes the normally open contacts 177 and 178, 179 and 180, 181 and 182, connecting the motor 80 to the power lines 118, 132, 141 in such a manner that the motor rotates in a direction to raise the vertically movable end of the feed section B. Simultaneously with the closing of the contacts 177 to 182, normally open contacts 154, 155 on the motor controller 171 close establishing a holding circuit for the operating solenoid for the motor controller, and normally closed contacts 183, 184 on the motor controller are opened eliminating any possibility of the motor being accidentally connected to the power lines for rotation in an opposite direction. The motor 80 continues to rotate in a direction to raise the feed section, etc., until the stop switch 122 is depressed or one of the limit switches 163, 167 opens. The contacts 151, 152 of relay 148 are in parallel circuit with the normally closed contacts 165, 166 of index switch 167 to assure operation of the motor 80 even though switch 167 is open at the time by an adjustable stop or trip on the feed section hereinafter referred to.

Figure 5:
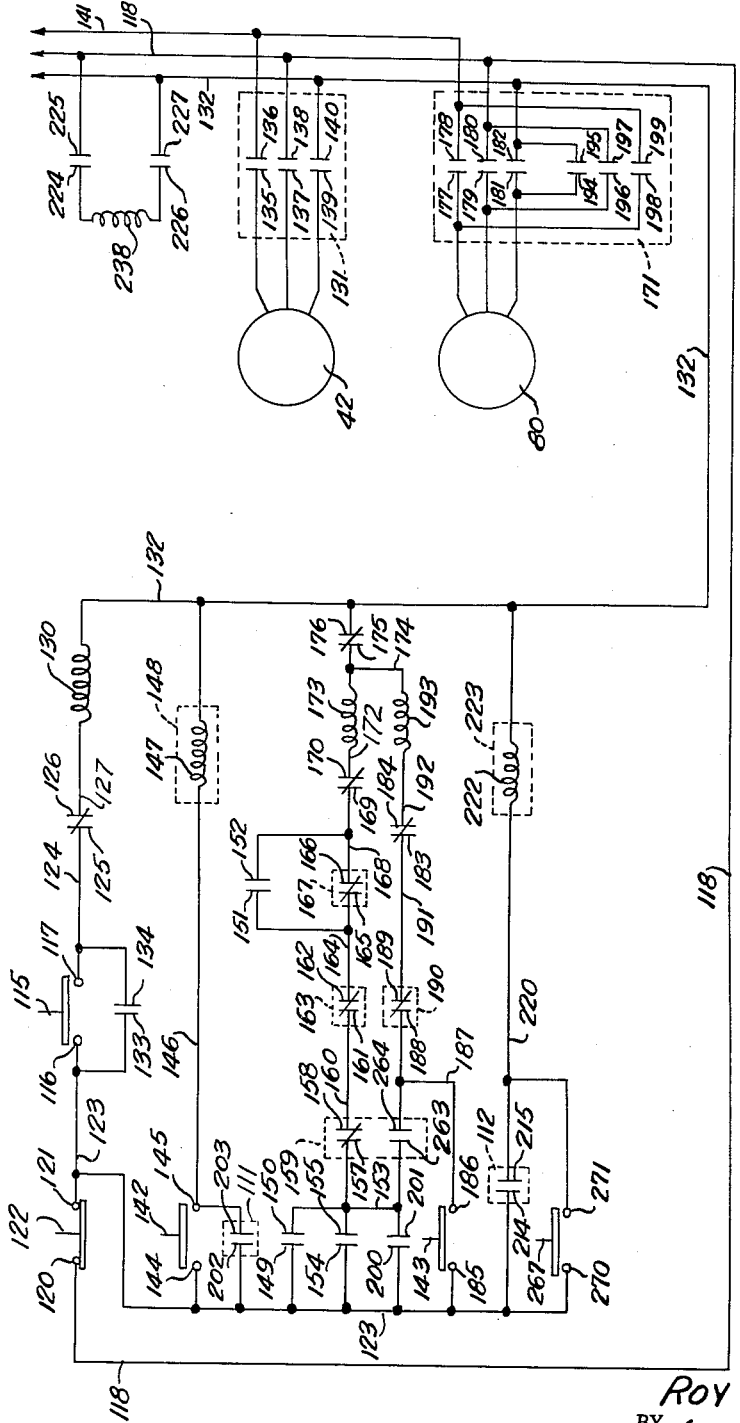
FIG. 5 is a schematic wiring diagram of the electrical control circuits.

The motor 80 is operated in the opposite direction to lower the vertically movable end of the cradle G by closing the down push button switch 143 to close the normally open contacts 185, 186 thereof, thereby establishing a circuit from the line 123 through the switch 143, wire 187, normally closed contacts 188, 189 of overtravel limit switch 190 not shown except in the wiring diagram, wire 191, normally closed contacts 183, 184 of motor controller 171, wire 192, operating solenoid 193 of motor controller 171, wire 174, and overload contacts 175, 176 to line 132. Energization of the operating solenoid 193 closes the normally open contacts 194 and 195, 196 and 197, and 198 and 199 of motor controller 171, thereby connecting the hoist motor 80 to the power lines 118, 132, and 141 for rotation in the opposite direction; that is, in a direction to lower the movable end of the crade G. Simultaneously with the closing of the contacts 194 to 199, normally open contacts 200, 201 are closed establishing a holding circuit for the motor controller 171 if the direction switch 159 is set for movement of the cradle G in a downwardly direction, that is with its contacts reversed from that shown in FIGURE 5. Normally closed contacts 169, 170 in series with the up operating solenoid of the motor controller 171 are opened thus preventing any possibility of the motor 80 being connected to the power lines for operation in the reverse direction. If the holding circuit referred to is not established the motor continues to operate as long as the push button switch 143 is held closed. If the holding circuit mentioned is established the motor continues to operate until the stop push button switch 122 is depressed or the limit switch 190 is operated to open its normally closed contacts 188, 189.

Although the movable end of the cradle G may be reciprocated vertically in a continous manner and the feeding operation synchronized to take place as rolls 70, 98 pass or align with the various decks in the embodiment of the invention shown the movable end of the cradle is intermittently moved or indexed in an upward direction to bring the rolls 70, 98 into alignment with the various decks and is rapidly returned to its lower position after a sheet of veneer has been fed to the lower deck.

With the motor 42 in operation and the conveyor mechanism or rollers of the decks of the dryer A and feed section C in operation, the switch 111 forming a part of synchronizing unit 110 will be periodically closed. Assuming that the sheets of veneer being fed to the dryer are eight feet long, the switch 111 is actuated to close its normally open contacts 202, 203 once for each travel of the conveyors of approximately 1.6 feet.

The bottom and top positions of the feed section C are controlled by the limit switch 159 carried by the plate 39 of the end member 41 of the frame F of the feed section E and connected to a rod 204 slidably supported on the plate 39 by brackets 205, 206 and movable between two positions by top and bottom stops 207, 208 adjustably connected to the rod 204 and in position to be engaged by the upper and lower edges of the plate 59 of the cradle as it approaches its upper and lower limits of travel. The rod 204 can be retained in one or the other of its positions by suitable grooves therein adapted to be engaged by spring pressed detents in one or both of the brackets 205, 206. The intermediate rest positions of the movable end of the crade are controlled as previously suggested by the limit switch 167 fixed to the plate 39 of the frame of the feed unit and adapted to be actuated by adjustable stops 210, 211 and 212 on the adjacent side of the end member 59 of the cradle.

The closing of normally open contacts 202, 203 of cycle switch 111 establishes a circuit from the line 123 through the wire 146 operating solenoid 147 of relay 148 to line 132 closing the normally open contacts 149, 150 and 151, 152 thereof. The closing of these contacts establishes a circuit from the wire 123 through the now closed contacts 149, 150, wire 153, now closed contacts 157, 158 of selecting switch 159, wire 160, normally closed contacts 161, 162 of up travel, safety limit switch 163, wire 164, now closed contacts 151, 152 of relay 148 or normally closed contacts 165, 166 of limit switch 167 connected to the frame of the feed unit E, wire 168, contacts 169, 170 of motor controller 171, wire 172, operating solenoid 173 of motor controller 171, wire 174, and overload contacts 175, 176 of motor controller 171 to line 132.

Energization of the operating solenoids 173 of motor controller 171 closes the normally open contacts 177 and 178, 179 and 180, 181 and 182, 154 and 155 and opens the normally closed contacts 183 and 184. The closing of the normally open contacts 154, 155 of motor controller 171 establishes a holding circuit for the operating solenoid 173 thereof around the contacts 149, 150 of relay 148 from the line 123 to the wire 153. The closing of the normally open contacts 177 and 178, 179 and 180, 181, and 182 of motor controller 171 connects the hoist motor 80 to the power lines 118, 132, 141 so that it operates in a direction to raise the vertically movable end of the cradle G. The cam which operates switch 111 is preferably of such a character that the opening of contacts 202, 203 is delayed a short interval to assure movement of the stop, which opened switch 167, away from the switch 167 before contacts 202, 203 open to de-energize relay 148, and, in turn, open contacts 151, 152. The motor 80 continues to operate and the discharge end of the cradle to raise until the limit switch 167 which is connected to the inside plate 39 of the end member 41 of the frame of the feed unit E is opened by one of the following stops 210, 211, 212 carried by the cradle and adjustably connected thereto, there being one such stop for each of the intermediate decks 31, 32, 33 of the feed section, or until the reverse switch 159 is tripped by the stop 207 as will be hereinafter referred to. The opening of the normally closed contacts 165, 166 of limit switch 167 breaks the circuit for the operating solenoid 173 of the motor controller 171 causing the motor to stop and the solenoid release brake associated therewith to be applied. The movable end of the feed section is now in position to have a sheet of veneer fed to the next succeeding deck with which the rolls 70, 98 are now aligned.

After sufficient time has elapsed subsequent to the closing of contacts 202, 203 of switch 111 by the cycle control 110 the second cam on the control actuates switch 112 to close its normally open contacts 214, 215. The closing of the normally open contacts 214, 215 of switch 112 establishes a circuit from the wire 123 through the contacts 214, 215, wire 220, and operating solenoid 222 of relay 223 to line 132.

Energization of operating solenoid 222 of relay 223 closes the normally open contacts 224 and 225, 226 and 227. The closing of the normally open contacts 224 to 227 of relay 223 connects the operating solenoid 238 of the solenoid valve which controls the flow of pressure fluid to and from the motors 37 to cause the valve to admit pressure fluid to the top of the motor to drop or slow the slide 47 to drop and move the top rolls 35 into engagement with the veneer therebeneath and above the bottom roll 36. Simultaneously with the movement of the upper roll 66 into engagement with the veneer therebeneath, the stop 38 is raised allowing the sheet of veneer to be fed by the rolls 35, 36 onto the table or conveyor 71 and into the discharge rolls 70, 98 and, in turn, from the feed rolls 70, 98 into the deck of the feed section aligned therewith.

The rolls 35, 36 and 70, 98 continue to feed the veneer to the feed section C until the switch 112 opens. This switch is held closed by the cam of the cycle unit 110 until the feeding operation is completed; that is, until the trailing end of the veneer passes through the rolls 70, 98. The opening of the contacts 214, 215 of switch 112 breaks the circuit to the operating solenoid 222 to relay 223, de-energizing the operating solenoid 238 of the solenoid valve allowing the direction of pressure fluid to the motors 37 to be reversed whereupon the top rolls 35 are raised to inoperative position and the stop 38 returns to its lower operative position. The veneer is fed into the decks of the conveyor feed section at a considerably higher speed than that at which they travel since the feed unit feeds five decks successively.

The cycle of operations just described is repeated by the switch 111 being again operated by the synchronizing mechanism. As the vertically movable end of the cradle of the unit reaches the position wherein the rolls 70, 98 are in alignment with the top deck, the adjustable stop 207 is engaged by the upper edge of the cradle and the selecting switch 159 is operated to open the normally closed contacts 157, 158 thereof and to close the then open contacts 263, 264 of the direction selecting switch 159. The opening of the previously closed contacts 157, 158 de-energizes the operating solenoid 173 of the motor controller 171 and stops the motor 80. Upon the next operation of the sequence switch 111 and the resultant closing of the normally open contacts 202, 203 thereof, a circuit is established which causes the hoist motor 80 to operate in a direction to lower the vertically movable end of the cradle to its bottom position; that is, with its discharge rolls 70, 98 in alignment with the bottom deck 30 of the feed section.

With the selecting switch 159 in the position just referred to, the closing of the normally open contacts 202, 203 of switch 111 establishes a circuit from the wire 123 through the now closed contacts 202, 203, wire 146, operating solenoid 147 of relay 148 to line 132 closing its normally open contacts 149, 150, establishing a circuit from the wire 123 through now closed contacts 149, 150, wire 153, now closed contacts 263, 264 of selecting switch 159, wire 187, normally closed contacts 188, 189 of down travel safety limit switch 190, wire 191, normally closed contacts 183, 184 of motor controller 171, wire 192, operating solenoid 193 of motor controller 171, wire 174, and overload contacts 175, 176 to line 132, thereby energizing the solenoid 193 and closing the normally open contacts 194 and 195, 196 and 197, 198 and 199, 200 and 201 of motor controller 171. The closing of normally open contacts 200, 201 establishes a holding circuit for the operating solenoid 193 around the contacts 149, 150 of relay 148.

The closing of the normally open contacts 194 and 195, 196, and 197, 198 and 199 connects the hoist motor 80 to the power lines 118, 132, 141 in such a manner that the motor rotates in a direction to lower the vertically movable end of the cradle G. The motor continues to operate and the cradle to descend until the cradle reaches its lower position, at which time the selecting switch 159 is operated by the stop 207 to open contacts 263, 264 thereof to de-energize the operating solenoids 193 and stop the motor. Operation of the selecting switch 159 to open the contacts 263, 264 thereof causes contacts 157, 158 of the switch to subsequently close and reestablish the circuit so that the hoist motor 80 will be operated in the reverse direction; that is, in the direction to raise the vertically movable end of the cradle upon the next closing of the normally open contacts 202, 203 of the switch 111. The cycle of operations continues with the feeding mechanism delivering veneer to the decks of the dryer in sequence as long as the machine is continued in operation and veneer is introduced between the rolls 35, 36 of the feed mechanism.

Provision is made for manually controlling the dropping of the upper roll 35 in the form of a push button switch 267 comprising normally open contacts 270, 271, the closing of which establishes a circuit from the line 123 through the contacts 270, 271, wire 220, and operating solenoid 222 of relay 223 to the line 132.

Instead of being located at the positions shown and operated in the manner described the cradle reversing limit switch 159 and the cradle intermediate rest positions limit switch 167 can form part of a unit designated generally as H, see FIG. 6, and including a plate 279 adjustably connected to the frame of the feeder near its top and comprising a plurality of trips 280 to 284 connected to a disk rotatably supported in the plate 279 and driven from the front end of the shaft 82 by a sprocket drive 286. The trips 280, 284 actuate the two position switch 159 to determine the upper and lower limits of the cradle movement and the trips 281, 282, 283 correspond with the trips 210, 211, 212 previously mentioned. The trips 280 to 284 are adjustably connected to the disk 285 so that the positions at which the cradle is stopped and/or its direction of movement reversed can be adjusted as required.

While the invention thas been herein illustrated and described as though a single row of veneer was being processed at one time, the usual practice is to process a plurality of sheets simultaneously, the number depending upon the width of the veneer sheets being treated and the width of the dryer, etc.

As previously explained in the embodiment shown, the stack of veneer is moved vertically by the elevator D' to maintain the top of the stack at the same height or approximately the same height as the top of the bottom roll 36 at the infeed end of the feed unit E. As an alternative arrangement, however, the elevator may be omitted and the bearings 44 connected to elevatable members which may be supported and moved vertically in a manner similar to that in which the members within which the pinch rolls shown in Parker patent, No. 2,649,182 are supported and moved. In this event, it will be understood that the motor 42 will be connected to the elevatable assembly.

Regardless of how the sheets of veneer are brought to and inserted between the roll means 35, 36 of the feed and unit, the feed mechanism of the present invention will feed veneer to a multiple deck dryer in predetermined sequence and in properly spaced relation with respect to the other veneer on the various decks. The fact that the veneer engaging peripheries or treads of the top roll means may yield under pressure independently of one another assures the proper feeding of the veneer regardless of whether the sheets are warped or perfectly flat.

From the foregoing it will be apparent that the objects heretofore enumerated and others have been accomplished and that there has been provided a novel and improved apparatus for feeding veneer to a multiple deck dryer, or, in fact, any similar sheet material to a multiple deck machine in predetermined sequence and in predetermined spaced relation. While the preferred embodiment of the invention has been described with considerable detail, the invention is not limited to the particular construction shown and it is the intention to cover hereby all adaptations, modifications and uses thereof which come within the practice of those skilled in the art to which the invention relates and the scope of the appended claim.

Having thus described my invention, I claim:

In equipment for feeding sheet veneer material into a multiple power driven conveyor deck-type machine from the top of a plurality of stacks of veneer material in sheet form on an elevatable member in spaced relation with respect to the machine, feed mechanism intermediate the stack of veeneer sheets and the machine comprising a discrete frame having two spaced vertically extending side members, a first set of feed rolls comprising top and bottom roll means said bottom roll means of said first set of feed rolls comprising a continuous roll extending between and rotatably supported by said vertically extending side members of said frame for rotation about a fixed axis, first means for driving said bottom roll means of said first set of feed rolls to advance sheet material positioned between said top and bottom roll means of said first set of feed rolls, conveyor means at the discharge side of said first set of feed rolls for receiving sheet material passed between said first set of feed rolls, said conveyor means having vertically extending side members, second means for connecting the end of said conveyor means adjacent to said first set of feed rolls to said frame for pivotable movement about said first set of feed rolls, third means supporting said top roll means of said first set of feed rolls in said conveyor means above said bottom roll means of said first set of feed rolls, said top roll means of said first set of feed rolls comprising a plurality of discrete rolls, fourth means yieldably biasing the respective rolls of said top roll means of said first set of feed rolls in a direction towards said bottom roll means of said first set of feed rolls, fifth means for normally maintaining said top roll means of said first set of feed rolls spaced above said bottom roll means of said first set of feed rolls, sixth means for effecting movement of said top roll means of said first set of said rolls as a unit towards said bottom roll means of said first set of feed rolls, said conveyor means comprising a second set of feed rolls at the end thereof remote from said first set of feed rolls, said bottom roll means of said second set of feed rolls comprising a continuous roll extending between and rotatably supported by said vertically extending side members of said conveyor means for rotation about an axis fixed with respect to said conveyor means, seventh means for driving said bottom roll means of said second set of feed rolls, said top roll means of said second set of feed rolls comprising a plurality of discrete rolls, eighth means yieldably biasing the respective rolls of said top roll means of said second set of feed rolls in a direction towards said bottom roll means of said second set of feed rolls, ninth means for automatically intermittently moving said conveyor means about said fixed axis in one direction to step said second set of feed rolls from one deck of a machine being fed to another and subsequently return said second set of feed rolls to starting position, and tenth means for operating said fifth means and said ninth means in timed relation to one another and the speed of operation of the machine being fed.

References Cited in the file of this patent
UNITED STATES PATENTS

| | | |
|---|---|---|
| 317,379 | Lane | May 5, 1885 |
| 1,941,484 | Nasmith | Jan. 2, 1934 |
| 2,233,149 | Welk | Feb. 25, 1941 |
| 2,595,015 | Sparks | Apr. 29, 1952 |
| 2,649,182 | Parker | Aug. 18, 1953 |
| 2,799,381 | Beckley | July 16, 1957 |

UNITED STATES PATENT OFFICE

CERTIFICATE OF CORRECTION

Patent No. 3,061,065            October 30, 1962

Roy Edward Worthington

It is hereby certified that error appears in the above numbered patent requiring correction and that the said Letters Patent should read as corrected below.

Column 10, line 11, after "said", second occurrence, insert -- fixed axis of rotation of said bottom roll means of said --.

Signed and sealed this 26th day of March 1963.

(SEAL)
Attest:

ESTON G. JOHNSON

Attesting Officer

DAVID L. LADD

Commissioner of Patents